United States Patent [19]

Sasaki et al.

[11] Patent Number: 4,602,372
[45] Date of Patent: Jul. 22, 1986

[54] GAS LASER GENERATOR

[75] Inventors: Kouji Sasaki; Hiroyuki Sugawara; Kouji Kuwabara, all of Hitachi; Toshiharu Shirakura, Ibaraki; Yukio Kawakubo; Satoshi Takemori, both of Hitachi, all of Japan

[73] Assignee: Hitachi, Ltd., Tokyo, Japan

[21] Appl. No.: 549,823

[22] Filed: Nov. 8, 1983

[30] Foreign Application Priority Data

Nov. 10, 1982 [JP] Japan ................ 57-195912

[51] Int. Cl.[4] .............................................. H01S 3/03
[52] U.S. Cl. ...................................... 372/58; 372/34; 372/61; 372/93
[58] Field of Search .................... 372/58, 93, 34, 61

[56] References Cited

U.S. PATENT DOCUMENTS 4,351,052 9/1982 Sasaki et al. .......................... 372/58
4,470,144 9/1984 Sano et al. ............................. 372/58

Primary Examiner—James W. Davie
Attorney, Agent, or Firm—Antonelli, Terry & Wands

[57] ABSTRACT

A discharge tube structure of a gas laser generator has end common vessels at its both end sections and an intermediate common vessel at its intermediate section. The end common vessels and intermediate common vessel are connected through the first and second cooling ducts to a centrifugal blower, which is provided at its center the first communicating port communicating with the first cooling duct and at least two second communicating ports communicating with the second cooling ducts opposed to each other with respect to the first communicating port. The simplified second cooling ducts allows the mixture gas to be supplied smoothly to the intermediate common vessel, thereby increasing the laser output.

6 Claims, 9 Drawing Figures

GAS LASER GENERATOR

BACKGROUND OF THE INVENTION

The present invention relates to a gas laser generator having improved gas cooling ducts.

It is generally desired that the laser beam produced by a gas laser generator has the Gaussian distribution profile of energy flux. Namely, when the energy density of the laser beam is plotted on the vertical axis against the distance of a point from the center of the laser beam on the horizontal axis, the Gaussian distribution is characterized by an extremely high energy density at the central portion of the laser beam relative to that at points in the peripheral region ranging from an intermediate point which slightly comes off the beam center to a point on the outer boundary of the beam. The higher the energy density at the central portion than that in the peripheral region, better is the converging characteristics of the laser beam. In cutting or welding steel plates using a laser beam, the better laser converging characteristics allow a narrower cut or welded portion, resulting in a precise machining and reduction of machining time.

The gas laser generator can produce a laser beam with the better converging characteristics by using a long discharge tube with a small diameter. A long discharge tube is made by joining a plurality of discharge tubes each having a discharge section, and it is formed in a crank structure to avoid longitudinal dimension which is too large. For example, a gas laser generator disclosed in U.S. Pat. No. 4,351,052 has the structure of two discharge tubes disposed in parallel with discharge sections located at the right and left portions of each tube. A common vessel connects the ends of both discharge tubes to form a complete discharge tube structure. The end sections and intermediate sections of the discharge tube structure are provided with two systems of cooling ducts, each system including a heat exchanger and a centrifugal blower. By the operation of the centrifugal blowers, a mixture gas, e.g., $CO_2$, He and $N_2$, circulates through the discharge tubes and cooling ducts, and the interior of the discharge tube structure is cooled. This arrangement, however, uses two centrifugal blowers in two systems, making the arrangement of the cooling ducts complex. This makes the smooth feeding of the mixture gas into the discharge tubes difficult, resulting in a lower laser output. The operation of two centrifugal blowers increases the vibration, resulting possibly in a positional error of the reflectors and output mirror.

SUMMARY OF THE INVENTION

It is an object of the present invention to provide a gas laser generator having increased laser output power.

In order to achieve the above object of the invention, the cooling ducts are provided at both end sections and the intermediate section of the discharge tube structure, and the inventive gas laser generator comprises end common vessels and an intermediate common vessel which communicate with all discharge tubes at their end sections and intermediate section, first and second cooling ducts communicating with the end common vessels and an intermediate common vessel, and a centrifugal blower having a first communicating port located at the center thereof for communicating with the first cooling duct and at least two second communicating ports communicating with the second cooling ducts opposed to each other with respect to the first communicating port, whereby the second communicating ports can be disposed symmetrically with respect to the intermediate common vessel and the second cooling duct can be arranged linearly so that the mixture gas is fed to the intermediate common vessel smoothly, and thus the laser output can be increased.

BRIEF DESCRIPTION OF THE DRAWINGS

The present invention will be apparent from the following detailed description taken in conjunction with the accompanying drawings, in which.

DETAILED DESCRIPTION OF SEVERAL PREFERRED EMBODIMENTS

Figure 1:
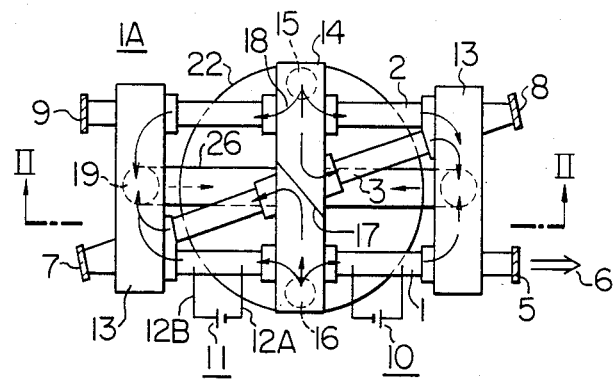
FIG. 1 is a plan view showing the gas laser generator embodying the present invention.
Figure 2:
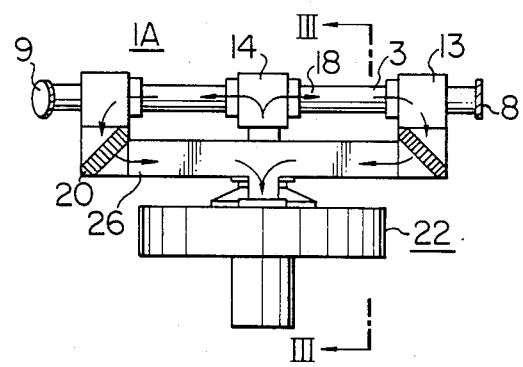
FIG. 2 is a sectional view taken along the line II—II of FIG. 1.
Figure 3:
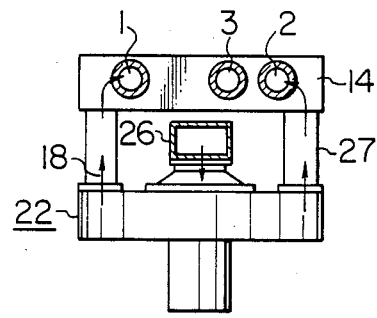
FIG. 3 is a sectional view taken along the line III-—III of FIG. 2.

One embodiment of the invention will now be described with reference to FIGS. 1 through 5.

A discharge tube structure 1A has a first discharge tube 1 and a second discharge tube 2 disposed in parallel and a third discharge tube 3 disposed diagonally between one end of the first discharge tube 1 and one end of the second discharge tube 2. The first discharge tube 1 is provided at its another end with an output mirror 5, which irradiates a laser beam 6 outside as shown by the arrow. The first reflector 7 is placed askew at the joint section of the first and third discharge tubes 1 and 3, and the second reflector 8 is placed askew at the joint section of the second and third discharge tubes 2 and 3. The second discharge tube 2 is provided with a reflector 9 at its another end. The first and second reflectors 7 and 8 are placed askew at an appropriate angle with respect to the related discharge tubes, so that the second reflector 8 and the output mirror 5 substantially confront with each other via the reflector 7, and the first reflector 7 and the reflector 9 substantially confront with each other via the reflector 8. A pair of discharge sections 10 and 11 are each made up of a cathode 12A and an anode 12B, and are located within each discharge tube.

End common vessels 13 and an intermediate common vessel 14 are provided at both end sections and intermediate section of the discharge tube structure respectively, so that the discharge tubes 1, 2 and 3 communicate with one another. In-ports 15 and 16 are formed at both ends of the intermediate common vessel 14, which is provided therein with a partition plate 17 placed askew between the in-parts 15 and 16. The mixture gas 18 entering through the in-ports 15 and 16 thus flows evenly to the discharge sections 10 and 11 in each discharge tube as shown by the arrows. Out-ports 19 are provided in the end common vessels between the first and second discharge tubes 1 and 2. Inside the end common vessels, heat exchangers 20 are provided.

A centrifugal blower 22 has a first communicating port 23 and second communicating ports 24 and 25 communicating with the out-ports 19 and in-ports 15 and 16 through the first cooling duct 26 and second cooling ducts 27, respectively. The first communicating port 23 is formed in the center of the centrifugal blower, while the communicating ports 24 and 25 are formed in both ends of a blower case 28 so that they are located symmetrically with respect to the first communicating port 23. The second communicating ports 24 and 25 partly communicate with the first communicating port 23, while one communicating port 24 and another communicating port 25 are separated by a partition plate 29. Located beneath the first communicating port 23 is a vane wheel 30 which is coupled to a drive shaft 32 of a high frequency motor 31. This arrangement of the centrifugal blower is called perpendicular placement, since the drive shaft 32 is oriented perpendicularly to the laser beam 6.

Figure 4:
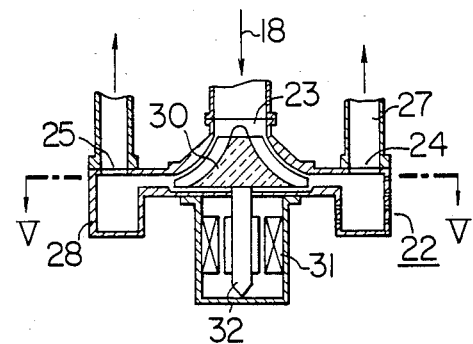
FIG. 4 is a side sectional view of the centrifugal blower shown in FIGS. 1, 2 and 3.
Figure 5:
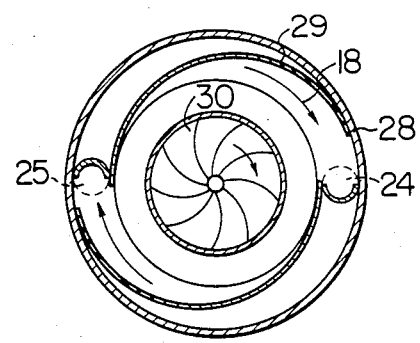
FIG. 5 is a sectional view taken along the line V—V of FIG. 4.

When the high frequency motor 31 is activated, the vane wheel 30 rotates as shown in FIGS. 4 and 5, and the mixture gas 18 circulates as shown by the arrows to cool the interior of the discharge tube structure. This arrangement of cooling ducts allows the second communicating ports 24 and 25 of the centrifugal blower 22 to be placed on the in-ports 15 and 16 of the intermediate common vessel 14, and the second cooling ducts 27 connecting the second communicating ports 24 and 25 to the in-ports 15 and 16 can be arranged linearly. Namely, the second cooling ducts from the second communicating ports to the intermediate common vessel can have a minimal length, allowing the mixture gas 18 from the second communicating ports 24 and 25 to flow smoothly into the second cooling ducts 27 and then to the intermediate common vessel 14, whereby the laser output can be increased. The partition plate 19 in the intermediate common vessel is placed askew so that the mixture gas 18 can flow easily. This allows the mixture gas 18 in the intermediate common vessel to flow evenly to the discharge sections 10 and 11 of each discharge tube, and laser output can further be increased.

Moreover, the intermediate common vessel 14 located between the two end common vessels 13 allows the discharge tubes 1, 2 and 3 to communicate with one another. This arrangement enhances the vibration tolerance of the discharge tube structure 1A against the horizontal and vertical vibrations. The single centrifugal blower 22 causes little vibration during the operation, relieving components within the discharge tube structure 1A, such as the output mirror and reflectors, of the positional error.

Other embodiments of the present invention will be described with reference to FIGS. 6 through 9.

Figure 6:
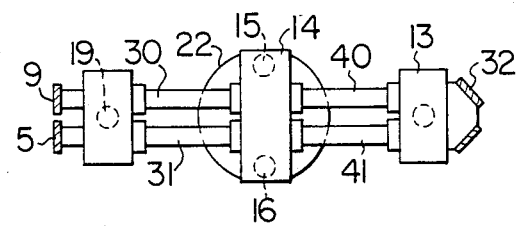
FIGS. 6 through 9 are plan views showing other embodiments of the invention.
Figure 7:
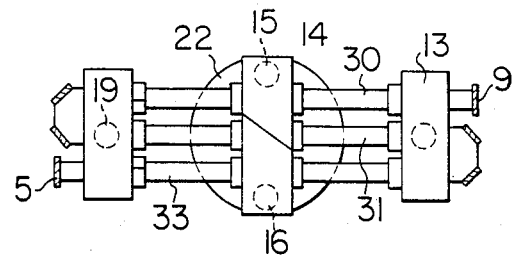
Figure 8:
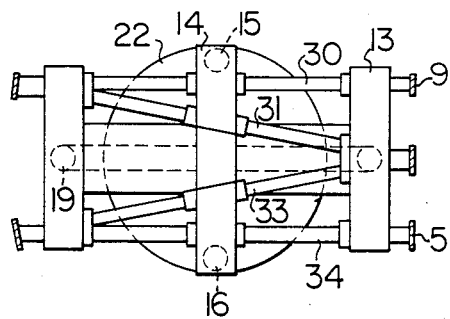
Figure 9:
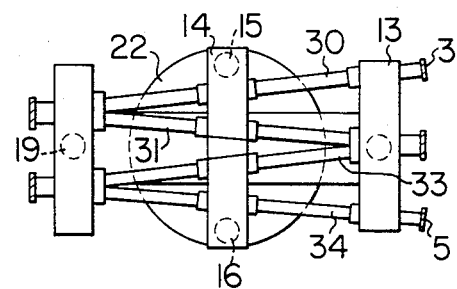

FIG. 6 shows the discharge tube structure having two discharge tubes 30 and 31 disposed in parallel with discharge sections located between end common vessels 13 and an intermediate common vessel 14. Beam-folding reflectors 32 are provided at the confronting ends of the discharge tubes, and an output mirror 5 and a reflector 9 are provided at another ends of the tubes. FIG. 7 shows the structure with a discharge tube 33 added to the structure of FIG. 6. The structures shown in FIGS. 8 and 9 are modified versions of FIG. 7 with an additional discharge tube 34. The structure of FIG. 9 differs from that of FIG. 8 in that the all discharge tubes 30, 31, 33 and 34 are disposed askew with respect to the common vessels.

The gas laser generators shown in FIGS. 6 through 9 are provided with out-ports 19 and in-ports 15 and 16 in the end common vessels 13 and intermediate common vessel 14, respectively, in the same fashion as shown in FIGS. 1 through 5, and these ports are structured to communicate with the centrifugal blower 22 via the first and second cooling ducts (not shown) as in the case of the first embodiment.

As described above, the inventive gas laser generator can increase the laser output.

We claim:

1. A gas laser generator having a discharge tube structure comprising a plurality of discharge tubes connected in series, each having discharge sections in right and left portions, and provided with mirrors for resonating a laser beam, cooling ducts communicating with end sections and an intermediate section of said discharge tube structure, a centrifugal blower provided for said cooling ducts, and a mixture gas which circulates for cooling through said discharge tube structure and said cooling ducts, said cooling ducts comprising:
   (A) end common vessels and an intermediate common vessel provided at both end sections and the intermediate section of said discharge tube structure and communicating said plurality of discharge tubes with one another;
   (B) a first cooling duct which communicates with one of said end common vessels and intermediate common vessel, and second cooling ducts which communicate with the other of said end common vessels and intermediate common vessel; and
   (C) a centrifugal blower having a first communicating port communicating with said first cooling duct, and at least two second communicating ports communicating with said second cooling ducts, said two second communicating ports located symmetrically with respect to said first communicating port.

2. A gas laser generator according to claim 1, wherein said intermediate common vessel is provided therein with a partition plate.

3. A gas laser generator according to claim 1, wherein said discharge tube structure comprises a plurality of discharge tubes arranged in a Z-shape placement.

4. A gas laser generator according to claim 2, wherein said discharge tube structure comprises a plurality of discharge tubes arranged in a Z-shape placement.

5. A gas laser generator according to claim 1, wherein said discharge tube structure comprises at least two discharge tubes arranged in parallel.

6. A gas laser generator according to claim 1, wherein said discharge tube structure comprises a plurality of discharge tubes arranged in an M-shape placement.

* * * * *